(12) United States Patent
Man (10) Patent No.: US 11,789,488 B2
(45) Date of Patent: Oct. 17, 2023

(54) PARALLEL BUS PHASE CORRECTION METHOD AND DEVICE

(71) Applicant: Inspur Suzhou Intelligent Technology Co., Ltd., Suzhou (CN)

(72) Inventor: Hongtao Man, Suzhou (CN)

(73) Assignee: Inspur Suzhou Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 17/772,937

(22) PCT Filed: May 28, 2020

(86) PCT No.: PCT/CN2020/092818
§ 371 (c)(1),
(2) Date: Apr. 28, 2022

(87) PCT Pub. No.: WO2021/082418
PCT Pub. Date: May 6, 2021

(65) Prior Publication Data
US 2022/0382321 A1    Dec. 1, 2022

(30) Foreign Application Priority Data
Oct. 30, 2019  (CN) .......................... 201911046029.2

(51) Int. Cl.
*G06F 1/12* (2006.01)
*G06F 11/27* (2006.01)

(52) U.S. Cl.
CPC ............... *G06F 1/12* (2013.01); *G06F 11/27* (2013.01)

(58) Field of Classification Search
CPC ...................................... G06F 1/32; G06F 1/12
See application file for complete search history.

(56) References Cited

U.S. PATENT DOCUMENTS

| 5,267,240 A | 11/1993 | Bartow |
| 6,185,693 B1 | 2/2001 | Garmire |
(Continued)

FOREIGN PATENT DOCUMENTS

| CN | 1075580 A | 8/1993 |
| CN | 1710508 A | 12/2005 |
(Continued)

OTHER PUBLICATIONS

International Search Report, PCT /CN2020/092818, dated Aug. 26, 2020.
(Continued)

*Primary Examiner* — Keshab R Pandey
(74) *Attorney, Agent, or Firm* — David R. Stevens; Stevens Law Group (57) ABSTRACT

A parallel bus phase correction method and a device are provided. The method comprises: correcting a data bus, respectively performing phase correction tests on a clock line; determining a first optimal window of the clock line according to the clock test results; correcting the clock line by using a median value of the first optimal window, respectively performing phase correction tests on the data bus according to the multiple second phase adjustment values, and recording corresponding data test results; determining a second optimal window of the data bus according to the data test results; and performing phase correction on normal data transmission on the basis of the median value of the first optimal window and the median value of the second optimal window. The method achieves phase correction and ensures the correctness and accuracy of data transmission, even if a small clock offset is present.

10 Claims, 3 Drawing Sheets

(56) References Cited

U.S. PATENT DOCUMENTS

| | | |
|---|---|---|
| 7,460,630 B2 | 12/2008 | Kato |
| 10,033,518 B2 | 7/2018 | Nandy |
| 10,585,840 B2 | 3/2020 | Yu |
| 2002/0037017 A1 | 3/2002 | Kiesel |
| 2005/0007359 A1* | 1/2005 | Iseki .................. G09G 3/30 345/204 |
| 2006/0247881 A1 | 11/2006 | Laquai |
| 2007/0074061 A1 | 3/2007 | Lin |
| 2008/0256282 A1* | 10/2008 | Guo .................. G06F 13/4239 710/305 |
| 2015/0071396 A1 | 3/2015 | Inagawa |
| 2022/0382321 A1 | 12/2022 | Man |

FOREIGN PATENT DOCUMENTS

| | | |
|---|---|---|
| CN | 1731380 A | 2/2006 |
| CN | 1735005 A | 2/2006 |
| CN | 1841354 A | 10/2006 |
| CN | 101655827 A | 2/2010 |
| CN | 102522981 A | 6/2012 |
| CN | 104424378 A | 3/2015 |
| CN | 105589828 A | 5/2016 |
| CN | 205750775 U | 11/2016 |
| CN | 106656182 A | 5/2017 |
| CN | 108694144 A | 10/2018 |
| CN | 109213703 A | 1/2019 |
| CN | 111124978 A | 5/2020 |

OTHER PUBLICATIONS

Written Opinion of the International Searching Authority, PCT/CN2020/092818, dated Aug. 26, 2020.

\* cited by examiner

PARALLEL BUS PHASE CORRECTION METHOD AND DEVICE

The present application claims the priority of the Chinese patent application No. 201911046029.2, filed on Oct. 30, 2019 and entitled "Parallel Bus Phase Correction Method and Device", which is incorporated herein by reference in its entirety.

TECHNICAL FIELD

The present application relates to the technical field of data transmission, in particular to a parallel bus phase correction method and device.

BACKGROUND ART

A parallel bus is mainly featured by transmission of multi-bit data at the same time, i.e., a multi-bit wide data bus; meanwhile, most parallel buses adopt a common clock design for a sending end and a receiving end to ensure correctness of data sending and reception. In order to ensure that the sending end and the receiving end have a common clock, the same crystal oscillator (or a clock module) may be adopted in the design to provide a clock, or the sending end may transmit the clock used during sending and the data bus to the receiving end, the receiving end uses the clock to sample the data bus, and such a method is called an associated clock. With an increase of transmission frequency, a small difference between the data bus and the clock bus on transmission delay on a board PCB or a cable due to limitations of physical device or process may lead to incorrect sampling of data bus by the receiving end, thereby resulting in communication errors. At the same time, changes in external conditions such as the working environment and working temperature of electrical equipment may also bring changes to performance of electrical equipment and bus delay, thereby resulting in sampling offsets and communication errors. The above is also a difficult point to limit the transmission frequency of the parallel bus.

Figure 1:
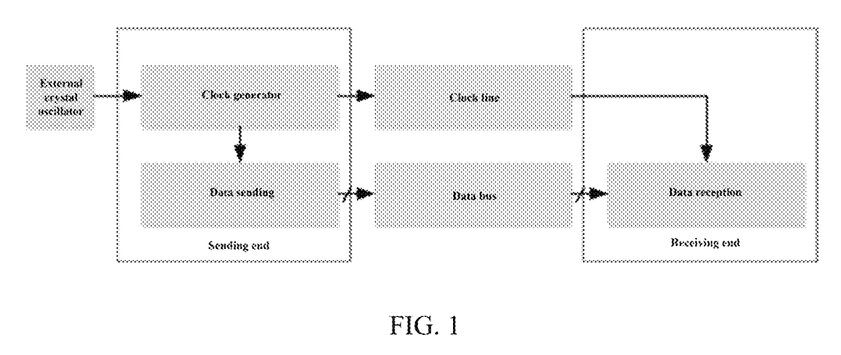
FIG. 1 shows a schematic diagram of traditional parallel bus data transmission in the prior art.
Figure 2:
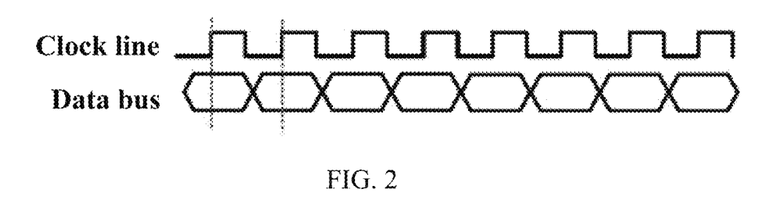
FIG. 2 shows a schematic diagram of the relationship between data and the clock sequence at the sending end in an ideal case.

Typically, the sending end obtains clock input through an external crystal oscillator, and internally, through a clock generator module, the sending end generates the required clock for bus transmission as an associated clock, as shown in FIG. 1. The data to be sent is transmitted to the data bus under this associated clock, meanwhile, the associated clock is directly transmitted to the clock line. Ideally, the relationship between data and the clock sequence at the sending end is as shown in FIG. 2.

With the embodiment of the prior art in FIG. 1 as an example, the sending end receives the clock on the clock line and directly takes it as a working clock for receiving data, and the data bus is sampled at this clock to obtain the transmission data.

Figure 3:
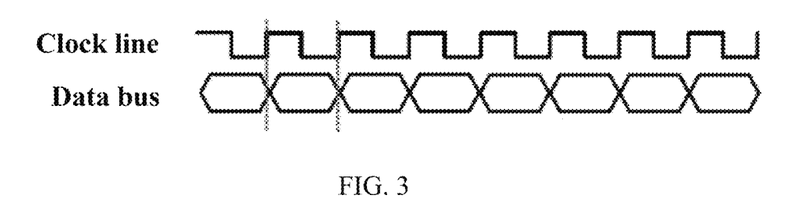
FIG. 3 shows a schematic diagram of offset between data and the clock sequence at the receiving end.

However, the existing parallel bus data transmission mainly has the following problems:
1. Due to the characteristics of the transmission medium between the sending end and the receiving end and the manufacturing process limitations, both PCB and transmission cable may not achieve absolute equal length of the data bus and the clock line or absolute consistency of the transmission time delay. This situation may lead to offsets in the sequential relationship between the data and the clock when a signal reaches the receiving end, and correct data may not be obtained by directly sampling the data bus with the associated clock. A rising edge of the clock may not be aligned with a more stable position of the data center, thereby resulting in sampling errors, as shown in FIG. 3.
2. The transmission delay of each data bit in the data bus may also be inconsistent, therefore, some bits may be sampled normally while some bits may not be sampled normally.
3. Changes in the working environment of electronic devices will lead to changes in the performance of the devices or lines after the electronic devices are heated during operation, thereby resulting in changes in the original normally sampled sequential relationship and unstable transmission.

As to the above shortcomings of the technical solution in the prior art, along with an increase in the transmission frequency, the period of the associated clock will become smaller and smaller, and the impact on the transmission will become more and more serious.

Therefore, aiming at the problems of offset between the clock and data sequence, multi-bit data bus delay inconsistency, and environmental sensitivity in the design of parallel bus, an optimized method needs to be proposed to effectively calibrate the offset and ensure correct data transmission.

SUMMARY OF THE INVENTION

On the one hand, the present application provides a parallel bus phase correction method based on the above objective, wherein the method includes the following steps:

correcting a data bus by using a minimum value in multiple preset second phase adjustment values of the data bus, respectively performing phase correction tests on a clock line according to multiple preset first phase adjustment values of the clock line, and recording corresponding clock test results;

determining a first optimal window of the clock line according to the clock test results;

correcting the clock line by using a median value of the first optimal window, respectively performing phase correction tests on the data bus according to the multiple second phase adjustment values, and recording corresponding data test results;

determining a second optimal window of the data bus according to the data test results; and performing phase correction on normal data transmission on the basis of the median value of the first optimal window and the median value of the second optimal window.

According to an embodiment of the parallel bus phase correction method of the present application, wherein the correcting a data bus by using a minimum value in multiple preset second phase adjustment values of the data bus, respectively performing phase correction tests on a clock line according to multiple preset first phase adjustment values of the clock line, and recording corresponding clock test results further includes:

correcting the data bus according to the minimum second phase adjustment value;

respectively performing phase correction and testing on the clock line in an order from smallest to largest according to the multiple first phase adjustment values; and recording the corresponding clock test results according to a test order.

According to an embodiment of the parallel bus phase correction method of the present application, wherein the determining a first optimal window of the clock line according to the clock test results further includes:

setting a number of consecutive first phase adjustment values whose clock test results are correct to a phase adjustment window, and taking the phase adjustment window containing the largest number of the first phase adjustment values as the first optimal window.

According to an embodiment of the parallel bus phase correction method of the present application, wherein the correcting the clock line by using a median value of the first optimal window, respectively performing phase correction on the data bus according to the multiple second phase adjustment values, and recording corresponding data test results further includes:

correcting the clock line according to the median value of the first optimal window;

respectively performing phase correction and testing on the bus of each bit in the data bus in an order from smallest to largest according to the multiple second phase adjustment values; and recording the corresponding data test results of the bus of each bit according to a test order.

According to an embodiment of the parallel bus phase correction method of the present application, wherein the determining a second optimal window of the data bus according to the data test results further includes:

for the bus of each bit, setting a number of consecutive second phase adjustment values whose data test results are correct to a phase adjustment window, and taking the phase adjustment window containing the largest number of the second phase adjustment values as the second optimal window of the bus of the corresponding bit.

According to an embodiment of the parallel bus phase correction method of the present application, wherein the phase correction tests further include:

generating a clock sequence and a test sequence;

sending and receiving the clock sequence and the test sequence on the clock line and the data bus; and verifying the received test sequence to judge whether the reception of the data is correct.

On the other hand, the present application further provides a parallel bus phase correction device, wherein the device includes:

at least one processor; and a memory, wherein the memory stores program instructions executable by the processors, and the program instructions perform the following steps when executed by the processors:

correcting the data bus by using a minimum value in multiple preset second phase adjustment values of the data bus, respectively performing phase correction tests on the clock line according to multiple preset first phase adjustment values of the clock line, and recording corresponding clock test results;

determining a first optimal window of the clock line according to the clock test results;

correcting the clock line by using a median value of the first optimal window, respectively performing phase correction tests on the data bus according to the multiple second phase adjustment values, and recording corresponding data test results;

determining a second optimal window of the data bus according to the data test results; and performing phase correction on normal data transmission on the basis of the median value of the first optimal window and the median value of the second optimal window.

According to an embodiment of the parallel bus phase correction device of the present application, wherein the correcting a data bus by using a minimum value in multiple preset second phase adjustment values of the data bus, respectively performing phase correction tests on a clock line according to multiple preset first phase adjustment values of the clock line, and recording corresponding clock test results further includes:

correcting the data bus according to the minimum second phase adjustment value;

respectively performing phase correction and testing on the clock line in an order from smallest to largest according to the multiple first phase adjustment values; and recording the corresponding clock test results according to a test order; moreover, the determining a first optimal window of the clock line according to the clock test results further includes:

setting a number of consecutive first phase adjustment values whose clock test results are correct to a phase adjustment window, and taking the phase adjustment window containing the largest number of the first phase adjustment values as the first optimal window.

According to an embodiment of the parallel bus phase correction device of the present application, the correcting the clock line by using a median value of the first optimal window, respectively performing phase correction on the data bus according to the multiple second phase adjustment values, and recording corresponding data test results further includes:

correcting the clock line according to the optimal first phase adjustment value;

respectively performing phase correction and testing on the bus of each bit in the data bus in an order from smallest to largest according to the multiple second phase adjustment values; and recording the corresponding data test results of the bus of each bit according to a test order; moreover, the determining a second optimal window of the data bus according to the data test results further includes:

for the bus of each bit, setting a number of consecutive second phase adjustment values whose data test results are correct to a phase adjustment window, and taking the phase adjustment window containing the largest number of the second phase adjustment values as the second optimal window of the bus of the corresponding bit.

According to an embodiment of the parallel bus phase correction device of the present application, the phase correction tests further include:

generating a clock sequence and a test sequence;

sending and receiving the clock sequence and the test sequence on the clock line and the data bus; and verifying the received test sequence to judge whether the reception of the data is correct.

By adopting the above technical solution, the present application at least has the following beneficial effects: the phase relationship between the clock and the data is calibrated by separately performing phase adjustment on the clock line and the data bus during the test. In the calibration process, instead of merely looking for the phase adjustment point where data is correctly received, the entire phase adjustment range of the clock and data is traversed to look for the maximum phase adjustment window where data is correctly received, and the median value is taken as the optimal phase adjustment value, such that the correctness and accuracy of data transmission may also be ensured even if a small clock offset is present due to an external environment or device stability issue during normal operation of the bus.

The present application provides various aspects of embodiments, and should not be used to limit the protection scope of the present application. Other execution modes may be conceived according to the technology described herein, which will be apparent to those skilled in the art after a study of the following accompanying drawings and specific embodiments, and these execution modes are intended to be included within the scope of the present application.

Embodiments of the present application are explained and described in more details below with reference to the accompanying drawings, but they should not be construed as a limitation of the present application.

DETAILED DESCRIPTION OF THE EMBODIMENTS

Although the present application may be implemented in various forms, some exemplary and non-limiting embodiments will be shown in the accompanying drawings and will be described below, however, it should be understood that the present disclosure will be considered as examples of the present application and is not intended to limit the present application to the specific embodiments illustrated herein.

Figure 4:
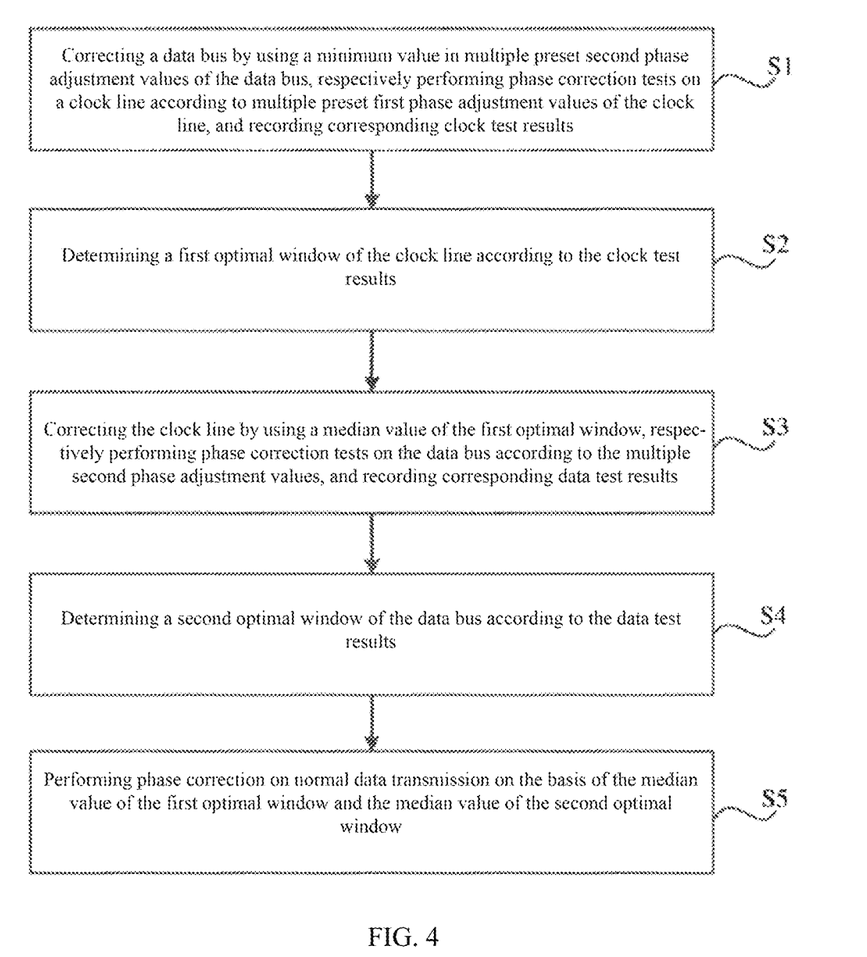
FIG. 4 shows a schematic block diagram of embodiments according to the parallel bus phase correction method of the present application.

In order to solve the problem of phase offset at the receiving end (please refer to the data and clock sequence offset illustrated in FIG. 3) relative to the sending end (please refer to the relationship between data and clock sequence in FIG. 2) during parallel bus data transmission which exists in the prior art and which is represented by the embodiment as shown in FIG. 1, and in the method of the present application, optimized phase correction is performed on the parallel bus. FIG. 4 shows a schematic block diagram of an embodiment of the method of parallel bus phase correction according to the present application. In the embodiment as shown in FIG. 4, the method at least includes the following steps:

S1: correcting a data bus by using a minimum value in multiple preset second phase adjustment values of the data bus, respectively performing phase correction tests on a clock line according to multiple preset first phase adjustment values of the clock line, and recording corresponding clock test results;

S2: determining a first optimal window of the clock line according to the clock test results;

S3: correcting the clock line by using a median value of the first optimal window, respectively performing phase correction tests on the data bus according to the multiple second phase adjustment values, and recording corresponding data test results;

S4: determining a second optimal window of the data bus according to the data test results; and S5: performing phase correction on normal data transmission on the basis of the median value of the first optimal window and the median value of the second optimal window.

Figure 5:
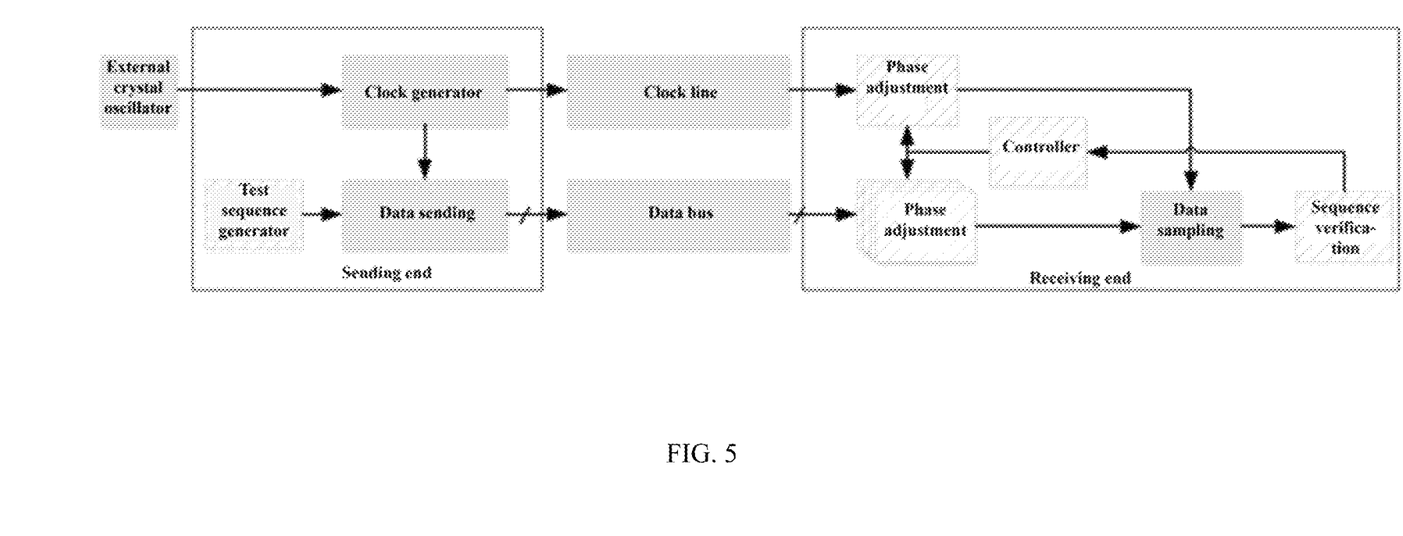
FIG. 5 shows a schematic diagram of parallel bus data transmission applying embodiments of the parallel bus phase correction method of the present application.

To achieve the above method, in the present application, some necessary functional modules are added to the functional structure aiming at conventional parallel bus data transmission, as shown in FIG. 5. Wherein, in some embodiments, the following improvements are made on the basis of traditional parallel bus:

1. A test sequence generator module is added at the sending end, to generate an agreed test sequence, and send to the data bus;
2. The phase adjustment module of the clock line is added at the receiving end, to perform certain phase adjustment on an input clock under the control of a controller module, to achieve the purpose of offset adjustment of the clock sequence;
3. A phase adjustment module of the data bus is added at the receiving end (multiple, depending on the bus data bit width), phase adjustment is performed on each bit of the input data bus separately, to achieve the purpose of performing offset adjustment on the data sequence;
4. A sequence verification module is added at the receiving end, to judge whether the currently received data is the corresponding data in the agreed test sequence, in order to determine whether the data may be correctly received at the current phase offset; and
5. A controller module is added at the receiving end, to receive feedback from the sequence verification module, so as to specify whether the corresponding phase adjustment is available and further decide whether to change the offset of the phase adjustment module.

Based on the above improvement at the sending end and an output end of the parallel bus, according to the embodiment of the method of the present application, the sending end and the receiving end both enter a bus link establishment mode at the start of bus operation. In the link establishment mode, the sending end starts the test sequence generator module, to send the agreed test sequence to the data bus. On this basis, first, in step S1, a data bus is corrected by using a minimum value in multiple preset second phase adjustment values of the data bus, phase correction tests are respectively performed on a clock line according to multiple preset first phase adjustment values of the clock line, and corresponding clock test results are recorded. Wherein the multiple preset second phase adjustment values of the data bus preferably include a "0" phase, i.e., preferably, in step S1, when no phase correction is performed on the data bus, phase correction is performed on the clock line respectively with multiple preset first phase adjustment values, to test separately to obtain the corresponding clock test results. The results include "true/T/1" or "false/F/0". After correction tests and recording the clock test results, in step S2, the first optimal window of the clock line is determined according to the clock test results, that is, the first optimal window for the first phase adjustment value of the clock line. The median value of the first optimal window is selected to correct the clock line to ensure correctness and accuracy of data transmission even if a small clock offset is present due to an external environment or device stability issue during normal operation of the bus. Moreover, on this basis, in step S3, phase correction is performed on the data bus respectively with multiple preset second phase adjustment values, to respectively test to obtain corresponding data test results, and the results include "true/T/1" or "false/F/0". Afterwards, in step S4, the second optimal window of the data bus is determined according to the data test results, that is, the second optimal window of the second phase adjustment value for the data bus. Similarly, the median value of the second optimal window is selected as the phase adjustment value of the finally selected correction data bus to ensure correctness and accuracy of data transmission even if a small clock offset is present due to an external environment or device stability issue during normal operation of the bus. After determining the optimal windows of phase adjustment of all the clock lines and data buses, the bus link establishment mode is finished. In step S5, phase correction is performed on normal data transmission based on the median value of the first optimal window and the median value of the second optimal window, that is, in the normal parallel bus data transmission process, the clock line is corrected with the median value of the first optimal window, and the data bus is corrected with the median value of the second optimal window. In some embodiments, the above multiple first phase adjustment values and multiple second phase adjustment values are respectively consecutive values within a certain range, to ensure to select a more precise and wider window of phase adjustment values.

Further embodiments of the present application will be described below. It should be noted that, without special instructions, the steps mentioned herein are used merely for convenient and clear indication of the step, and are not limited to the numbering of the steps.

In some embodiments of the parallel bus phase correction method of the present application, the correcting a data bus by using a minimum value in multiple preset second phase adjustment values of the data bus, respectively performing phase correction tests on a clock line according to multiple preset first phase adjustment values of the clock line, and recording corresponding clock test results in step S1 further includes:

S11: correcting the data bus according to the minimum second phase adjustment value;

S12: respectively performing phase correction and testing on the clock line in an order from smallest to largest according to the multiple first phase adjustment values; and S13: recording the corresponding clock test results according to a test order.

To accurately and conveniently determine the window of the most proper phase adjustment value for the clock line, in some embodiments, the correction test process in step S1 includes the above three sub-steps, wherein in sub-step S11, the data bus is corrected according to the minimum second phase adjustment value, preferably, "0" is taken as the second phase adjustment value, that is, the correction data bus is not corrected. On the basis of the sub-step S11, in sub-step S12, phase correction and testing are performed on the clock line respectively in an order from smallest to largest according to the multiple first phase adjustment values. Afterwards, in sub-step S13, the corresponding clock test results are recorded according to a test order, that is, the corresponding clock test results are recorded in an order from smallest to largest of the first phase adjustment values. For example, the preset first phase adjustment values are consecutive integers from 0 to 15, 16 adjustment values in total. Through tests, the results as shown in Table 1 may be obtained.

TABLE 1

| Phase adjustment values | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Test results | F | F | T | T | F | F | F | F | T | T | T | T | T | T | F | T | T |

In further embodiments of the parallel bus phase correction method of the present application, the determining the first optimal window of the clock line according to the clock test results in step S2 further includes: setting a number of consecutive first phase adjustment values whose clock test results are correct to a phase adjustment window, and taking the phase adjustment window containing the largest number of the first phase adjustment values as the first optimal window. With the phase adjustment values and the test results in the above Table 1 as an example, "2-3", "8-12" and "14-15" are respectively three phase adjustment windows. Wherein, the phase adjustment window containing the largest number of the first phase adjustment values is taken as the first optimal window, that is, the phase adjustment window "8-12" is taken as the first optimal window. Therefore, in the subsequent steps, a phase adjustment value may be selected from the above first optimal window "8-12" to perform phase correction, wherein a median value "10" of "8-12" may be preferably selected, to ensure that the left and right redundancy of the finally selected phase adjustment value is the same.

In several embodiments of the parallel bus phase correction method of the present application, the correcting the clock line by using a median value of the first optimal window, respectively performing phase correction on the data bus according to the multiple second phase adjustment values, and recording corresponding data test results in step S3 further includes:

S31: correcting the clock line according to the median value of the first optimal window;

S32: respectively performing phase correction and testing on the bus of each bit in the data bus in an order from smallest to largest according to the multiple second phase adjustment values; and S33: recording the corresponding data test results of the bus of each bit according to a test order.

To accurately and conveniently determine the window of the most proper phase adjustment value for the data bus, in some embodiments, the correction test process of step S3 include three sub-steps, wherein in sub-step S31, the clock line is corrected according to the median value of the first optimal window determined in step S2. On the basis of sub-step S31, in sub-step S32, phase correction and testing are performed on the bus of each bit in the data bus respectively in an order from smallest to largest according to the multiple second phase adjustment values. Since the parallel data bus includes multi-bit data line, while phase offset may also occur between the data line of each bit, therefore, phase correction may be performed respectively on the data line of each bit, and the window of the most proper phase adjustment value may be respectively determined for each bit of the data bus. Afterwards, in sub-step S33, the corresponding data test results of the bus of each bit are recorded according to a test order, that is, corresponding data test results are recorded according to an order from smallest to largest of the second phase adjustment values.

In further embodiments of the parallel bus phase correction method of the present application, the determining the second optimal window of the data bus according to the data test results in step S4 further includes: for the bus of each bit, a number of consecutive second phase adjustment values whose data test results are correct are set to a phase adjustment window, and the phase adjustment window containing the largest number of the second phase adjustment values is taken as the second optimal window of the bus of the corresponding bit. Since the parallel data bus includes multi-bit data line, therefore, in these embodiments, the respective second optimal window is determined for the bus of each bit according to the test result of the bus of each bit.

In one or more embodiments of the parallel bus phase correction method of the present application, the phase correction tests further include:

generating a clock sequence and a test sequence;

sending and receiving the clock sequence and the test sequence on the clock line and the data bus; and verifying the received test sequence to judge whether the reception of the data is correct.

Specifically speaking, the methods of phase correction tests on the clock line and the data bus may be the same. First, please refer to FIG. 5, at the sending end, the clock generator generates a clock sequence, while the test sequence generator generates a test sequence. The clock sequence is sent to the clock line, and the test sequence is sent to the data bus. After receiving the clock sequence and the test sequence, the receiving end performs data sampling on the corrected clock sequence and the test sequence through phase correction. Afterwards, sequence verification is performed, after a sequence verification module receives a certain amount of corrected data of the test sequence, the corrected data of the test sequence is compared with the agreed data, to judge whether the received data after correction is correct. If the two are consistent, the corresponding test results are "true/T/1"/; if the two are not consistent or not completely consistent, then the corresponding test results are "false/F/0".

On the other hand, the present application further provides a parallel bus phase correction device, wherein the device includes: at least one processor; and a memory, wherein the memory stores program instructions executable by the processors, and the program instructions perform the following steps when executed by the processors:

S1: correcting the data bus by using a minimum value in multiple preset second phase adjustment values of the data bus, respectively performing phase correction tests on the clock line according to multiple preset first phase adjustment values of the clock line, and recording corresponding clock test results;

S2: determining a first optimal window of the clock line according to the clock test results;

S3: correcting the clock line by using a median value of the first optimal window, respectively performing phase correction tests on the data bus according to the multiple second phase adjustment values, and recording corresponding data test results;

S4: determining a second optimal window of the data bus according to the data test results; and S5: performing phase correction on normal data transmission on the basis of the median value of the first optimal window and the median value of the second optimal window.

In some embodiments of the parallel bus phase correction device of the present application, the correcting a data bus by using a minimum value in multiple preset second phase adjustment values of the data bus, respectively performing phase correction tests on a clock line according to multiple preset first phase adjustment values of the clock line, and recording corresponding clock test results in step S1 further includes:

S11: correcting the data bus according to the minimum second phase adjustment value;

S12: respectively performing phase correction and testing on the clock line in an order from smallest to largest according to the multiple first phase adjustment values; and S13: recording the corresponding clock test results according to a test order; moreover, the determining a first optimal window of the clock line according to the clock test results in step S2 further includes: setting a number of consecutive first phase adjustment values whose clock test results are correct to a phase adjustment window, and taking the phase adjustment window containing the largest number of the first phase adjustment values as the first optimal window.

In still some other embodiments of the parallel bus phase correction device of the present application, the correcting the clock line by using a median value of the first optimal window, respectively performing phase correction on the data bus according to the multiple second phase adjustment values, and recording corresponding data test results in step S3 further includes:

S31: correcting the clock line according to the median value of the first optimal window;

S32: respectively performing phase correction and testing on the bus of each bit in the data bus in an order from smallest to largest according to the multiple second phase adjustment values; and S33: recording the corresponding data test results of the bus of each bit according to a test order; moreover, the determining a second optimal window of the data bus according to the data test results in step S4 further includes:

for the bus of each bit, setting a number of consecutive second phase adjustment values whose data test results are correct to a phase adjustment window, and taking the phase adjustment window containing the largest number of the second phase adjustment values as the second optimal window of the bus of the corresponding bit.

In one or more embodiments of the parallel bus phase correction device of the present application, the phase correction tests further include:

generating a clock sequence and a test sequence;

sending and receiving the clock sequence and the test sequence on the clock line and the data bus; and verifying the received test sequence to judge whether the reception of the data is correct.

The devices and equipment disclosed in the embodiments of the present application may be various electronic terminal devices, such as cell phones, personal digital assistants (PDAs), tablet personal computers (PADs), smart TVs, etc., and may also be large terminal devices, such as servers, etc. Therefore, the protection scope disclosed in the embodiments of the present application should not be limited to a particular type of device or equipment. The client disclosed in the embodiments of the present application may be applied to any of the above electronic terminal devices in the form of electronic hardware, computer software, or a combination of the two.

The computer readable storage media (e.g., a memory) described herein may be a volatile memory or a non-volatile memory, or may include both a volatile memory and a non-volatile memory. As an example and not a limitation, the non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM), and the RAM may act as an external cache memory. As an example and not a limitation, the RAM may be obtained in a variety of forms, such as synchronous RAM (DRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). The disclosed storage devices are intended to include, but are not limited to, these and other suitable types of memories.

By adopting the above technical solution, the present application at least has the following beneficial effects: the phase relationship between the clock and the data is calibrated by separately performing phase adjustment on the clock line and the data bus during the test. In the calibration process, instead of merely looking for the phase adjustment point where data is correctly received, the entire phase adjustment range of the clock and data is traversed to look for the maximum phase adjustment window where data is correctly received, and the median value is taken as the optimal phase adjustment value, such that the correctness and accuracy of data transmission may also be ensured even if a small clock offset is present due to an external environment or device stability issue during normal operation of the bus.

It should be understood that, when it is technically feasible, the technical features enumerated above for different embodiments may be combined with each other, to form additional embodiments within the scope of the present application. Furthermore, the particular examples and embodiments described herein are non-limiting and may be modified accordingly to the structure, steps and sequence set forth above without departing from the protection scope of the present application.

In the present application, the use of the reflexive conjunction is intended to include the conjunction. The definite or indefinite article is not intended to indicate a base number. Specifically, references to "the" object or "one" and "an" object are intended to indicate one possible object of a plurality of such objects. However, while the elements disclosed in the embodiments of the present application may be described or required in an individual form, they may also be understood as multiple unless expressly limited to a singular number. In addition, the conjunction "or" may be used to convey concurrent features rather than mutually exclusive solutions. In other words, the conjunction "or" should be understood to include "and/or". The term "includes" is inclusive and has the same scope as "includes".

The foregoing embodiments, and in particular any "preferred" embodiments, are possible examples of execution modes and are proposed for the sole purpose of clearly understanding the principles of the present application. Many variations and modifications may be made to the above embodiments without departing substantially from the spirit and principles of the technology described herein. All the modifications are intended to be included within the scope of the present disclosure.

The invention claimed is:

1. A parallel bus phase correction method, comprising the following steps:

correcting a data bus by using a minimum value in multiple preset second phase adjustment values of the data bus, respectively performing phase correction tests on a clock line according to multiple preset first phase adjustment values of the clock line, and recording corresponding clock test results;

determining a first optimal window of the clock line according to the clock test results;

correcting the clock line by using a median value of the first optimal window, respectively performing phase correction tests on the data bus according to the multiple second phase adjustment values, and recording corresponding data test results;

determining a second optimal window of the data bus according to the data test results; and performing phase correction on normal data transmission on the basis of the median value of the first optimal window and the median value of the second optimal window.

2. The method of claim 1, wherein the correcting a data bus by using a minimum value in multiple preset second phase adjustment values of the data bus, respectively performing phase correction tests on a clock line according to multiple preset first phase adjustment values of the clock line, and recording corresponding clock test results further comprises:

correcting the data bus according to the minimum second phase adjustment value;

respectively performing phase correction and testing on the clock line in an order from smallest to largest according to the multiple first phase adjustment values; and recording the corresponding clock test results according to a test order.

3. The method of claim 2, wherein the determining a first optimal window of the clock line according to the clock test results further comprises:

setting a number of consecutive first phase adjustment values whose clock test results are correct to a phase adjustment window, and taking the phase adjustment window containing the largest number of the first phase adjustment values as the first optimal window.

4. The method of claim 1, wherein the correcting the clock line by using a median value of the first optimal window, respectively performing phase correction on the data bus according to the multiple second phase adjustment values, and recording corresponding data test results further comprises:

correcting the clock line according to the median value of the first optimal window;

respectively performing phase correction and testing on the bus of each bit in the data bus in an order from smallest to largest according to the multiple second phase adjustment values; and recording the corresponding data test results of the bus of each bit according to a test order.

5. The method of claim 4, wherein the determining a second optimal window of the data bus according to the data test results further comprises:

for the bus of each bit, setting a number of consecutive second phase adjustment values whose data test results are correct to a phase adjustment window, and taking the phase adjustment window containing the largest number of the second phase adjustment values as the second optimal window of the bus of the corresponding bit.

6. The method of claim 1, wherein the phase correction tests further comprise:
   generating a clock sequence and a test sequence;
   sending and receiving the clock sequence and the test sequence on the clock line and the data bus; and
   verifying the received test sequence to judge whether the reception of the data is correct.

7. A parallel bus phase correction device, comprising:
   at least one processor; and
   a memory, wherein the memory stores program instructions executable by the processors, and the program instructions perform the following steps when executed by the processors: correcting the data bus by using a minimum value in multiple preset second phase adjustment values of the data bus, respectively performing phase correction tests on the clock line according to multiple preset first phase adjustment values of the clock line, and recording corresponding clock test results;
   determining a first optimal window of the clock line according to the clock test results;
   correcting the clock line by using a median value of the first optimal window, respectively performing phase correction tests on the data bus according to the multiple second phase adjustment values, and recording corresponding data test results;
   determining a second optimal window of the data bus according to the data test results; and
   performing phase correction on normal data transmission on the basis of the median value of the first optimal window and the median value of the second optimal window.

8. The device of claim 7, wherein the correcting a data bus by using a minimum value in multiple preset second phase adjustment values of the data bus, respectively performing phase correction tests on a clock line according to multiple preset first phase adjustment values of the clock line, and recording corresponding clock test results further comprises:
   correcting the data bus according to the minimum second phase adjustment value;
   respectively performing phase correction and testing on the clock line in an order from smallest to largest according to the multiple first phase adjustment values; and
   recording the corresponding clock test results according to a test order; moreover, the determining a first optimal window of the clock line according to the clock test results further comprises:
   setting a number of consecutive first phase adjustment values whose clock test results are correct to a phase adjustment window, and taking the phase adjustment window containing the largest number of the first phase adjustment values as the first optimal window.

9. The device of claim 7, wherein the correcting the clock line by using a median value of the first optimal window, respectively performing phase correction on the data bus according to the multiple second phase adjustment values, and recording corresponding data test results further comprises:
   correcting the clock line according to the optimal first phase adjustment value;
   respectively performing phase correction and testing on the bus of each bit in the data bus in an order from smallest to largest according to the multiple second phase adjustment values; and
   recording the corresponding data test results of the bus of each bit according to a test order;
   moreover,
   the determining a second optimal window of the data bus according to the data test results further comprises:
   for the bus of each bit, setting a number of consecutive second phase adjustment values whose data test results are correct to a phase adjustment window, and taking the phase adjustment window containing the largest number of the second phase adjustment values as the second optimal window of the bus of the corresponding bit.

10. The device of claim 7, wherein the phase correction tests further comprise:
    generating a clock sequence and a test sequence;
    sending and receiving the clock sequence and the test sequence on the clock line and the data bus; and
    verifying the received test sequence to judge whether the reception of the data is correct.

* * * * *